United States Patent [19]

Ou

[11] Patent Number: 5,388,565
[45] Date of Patent: Feb. 14, 1995

[54] SELF-HEATING CONTAINER SYSTEM

[76] Inventor: Lih-Horng Ou, 5, Alley 6, Lane 37, Tai Pin West Road, Pin Chang City,

[21] Appl. No.: 221,509

[22] Filed: Apr. 1, 1994

[51] Int. Cl.⁶ ............................................. F24J 1/00
[52] U.S. Cl. .................... 126/263 DC; 126/263 DD; 126/262
[58] Field of Search ................ 126/263, 262, 246; 426/109, 113, 114; 62/4

[56] References Cited

U.S. PATENT DOCUMENTS

| | | | |
|---|---|---|---|
| 3,561,424 | 2/1971 | Failla | 126/263 |
| 3,653,372 | 4/1972 | Douglas | 126/263 |
| 3,970,068 | 7/1976 | Sato | 126/263 |
| 4,528,218 | 7/1985 | Maione | 126/263 |
| 4,753,085 | 6/1988 | Labrousse | 126/263 |

FOREIGN PATENT DOCUMENTS 639489  4/1962  Canada .............................. 126/263

*Primary Examiner*—James C. Yeung
*Attorney, Agent, or Firm*—Morton J. Rosenberg; David I. Klein

[57] ABSTRACT

This invention relates to a self-heating container for heating beverages or food contained within the container. The self-heating container or can includes a cup containing active lime that is positioned underneath a thin plate and another cup filled with water. When a bottom cover of the self-heating container is pressed downwardly, sharp spikes above the water cup pierce a thin plate located between a chamber containing the water and the active lime and causes the water inside the cup to flow into the active lime which results in a chemical reaction that heats the contents of the can or container.

1 Claim, 4 Drawing Sheets

SELF-HEATING CONTAINER SYSTEM

BACKGROUND OF THE INVENTION

1. Field of the Invention

This invention relates to heating systems for heating food or beverages within a can or container without the necessity of initially removing the contents from the can or container.

2. Prior Art

Conventional cans do not have an internal heating device to heat the contents. If a person wants to drink a heated beverage from a can, it is necessary to either remove the contents prior to heating or open the can and heat the contents within the can. This is time consuming and inconvenient, especially when hiking through the countryside.

The primary objective of the invention herein is to use heat produced due to a chemical reaction that occurs when water is added to active lime in a device which heats the contents of a can. The user only has to press a bottom cover of the can to start the can heating process, thereby enabling consumers to automatically heat a beverage contained in a can that can be used whenever desired.

DESCRIPTION OF THE PREFERRED EMBODIMENTS

Figures 1, 1A:
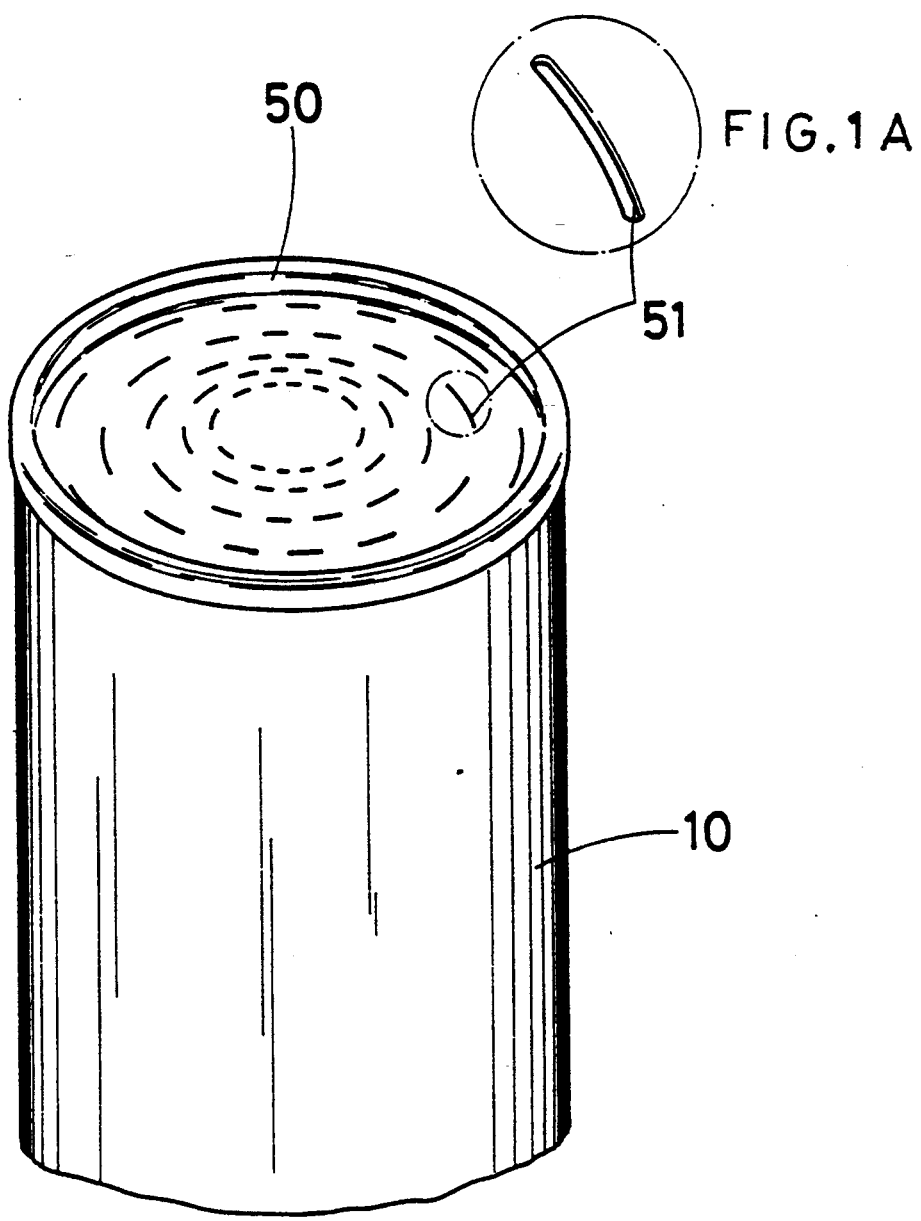
FIG. 1 is a perspective view, partially cut away of the self-heating can system of the invention concept.
FIG. 1A is an enlarged view of a ventilation opening formed in a bottom cover of the can system of the present invention.
Figure 2:
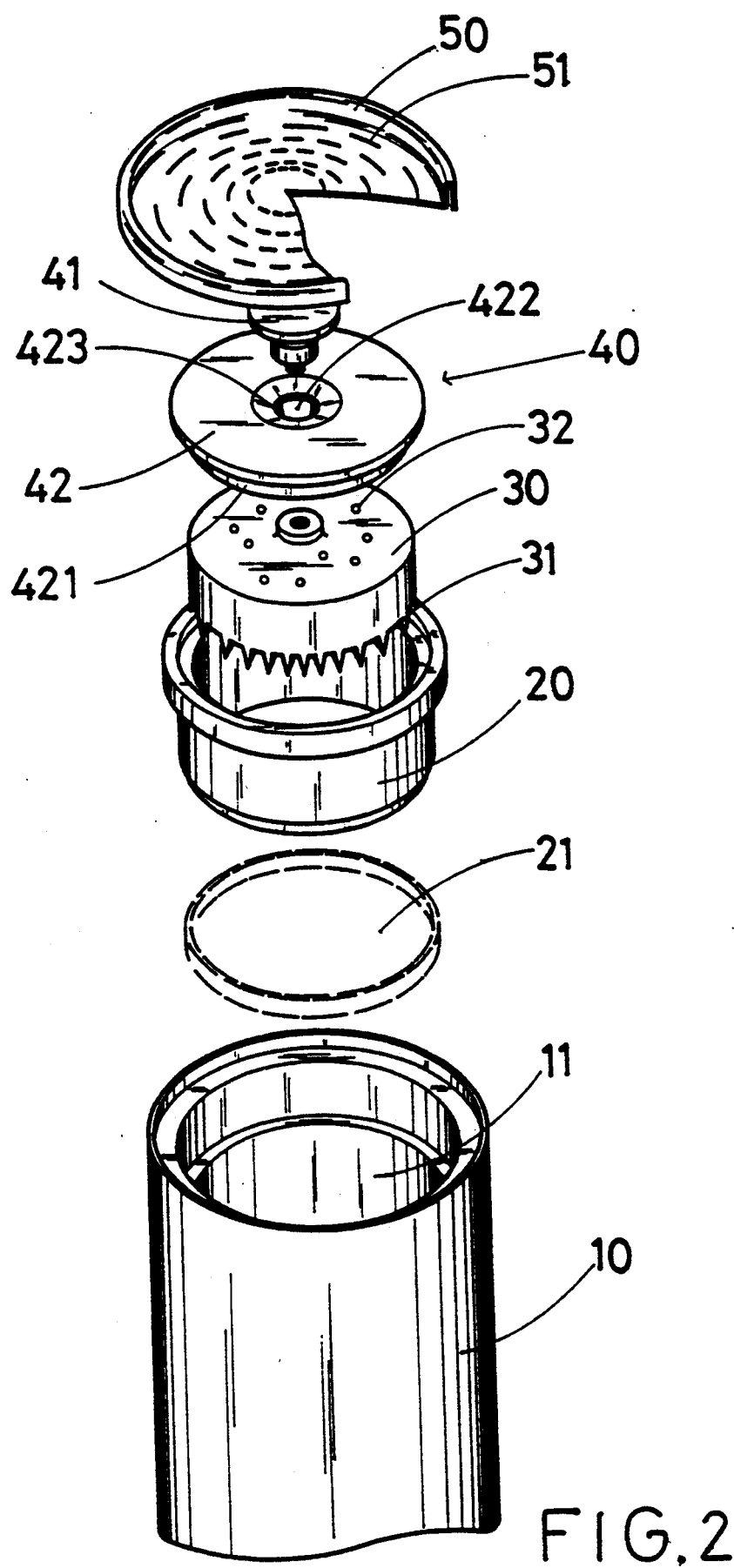
FIG. 2 is an exploded isometric view of the self-heating can system of the invention concept.

Referring now to FIGS. 1 and 2, there is shown a self-heating container system comprised of a can 10, a cylindrical cup 20, a cup-shaped spiking member 30, a positioner device 40 and a bottom cover 50 for the can 10.

Figure 3:
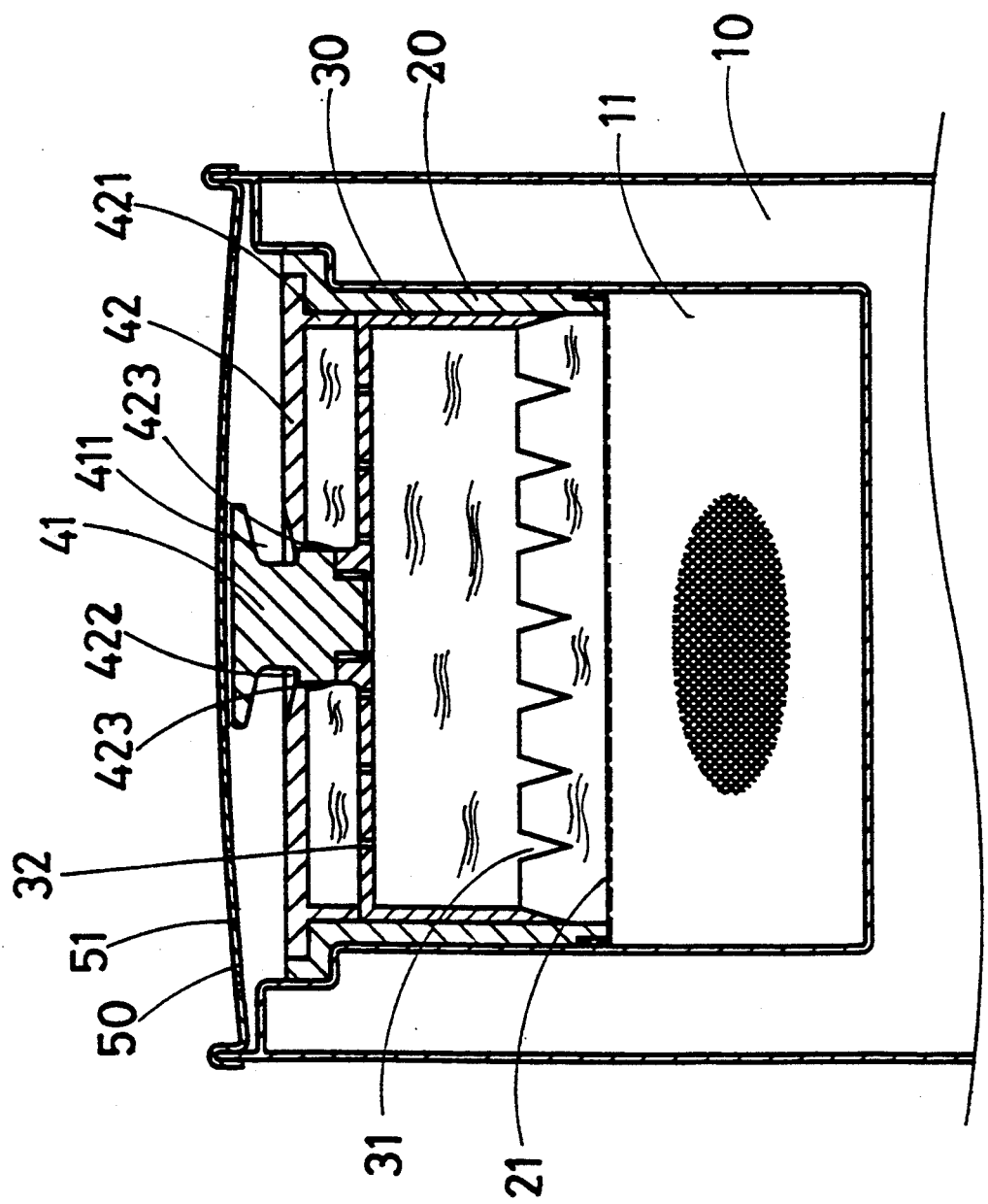
FIG. 3 is a cross-sectional view of the self-heating can system showing the invention concept; and, FIG. 4 is a cross-sectional view of the self-heating can system showing a piercing of a thin plate separating an active lime chamber and a water chamber.
Figure 4:
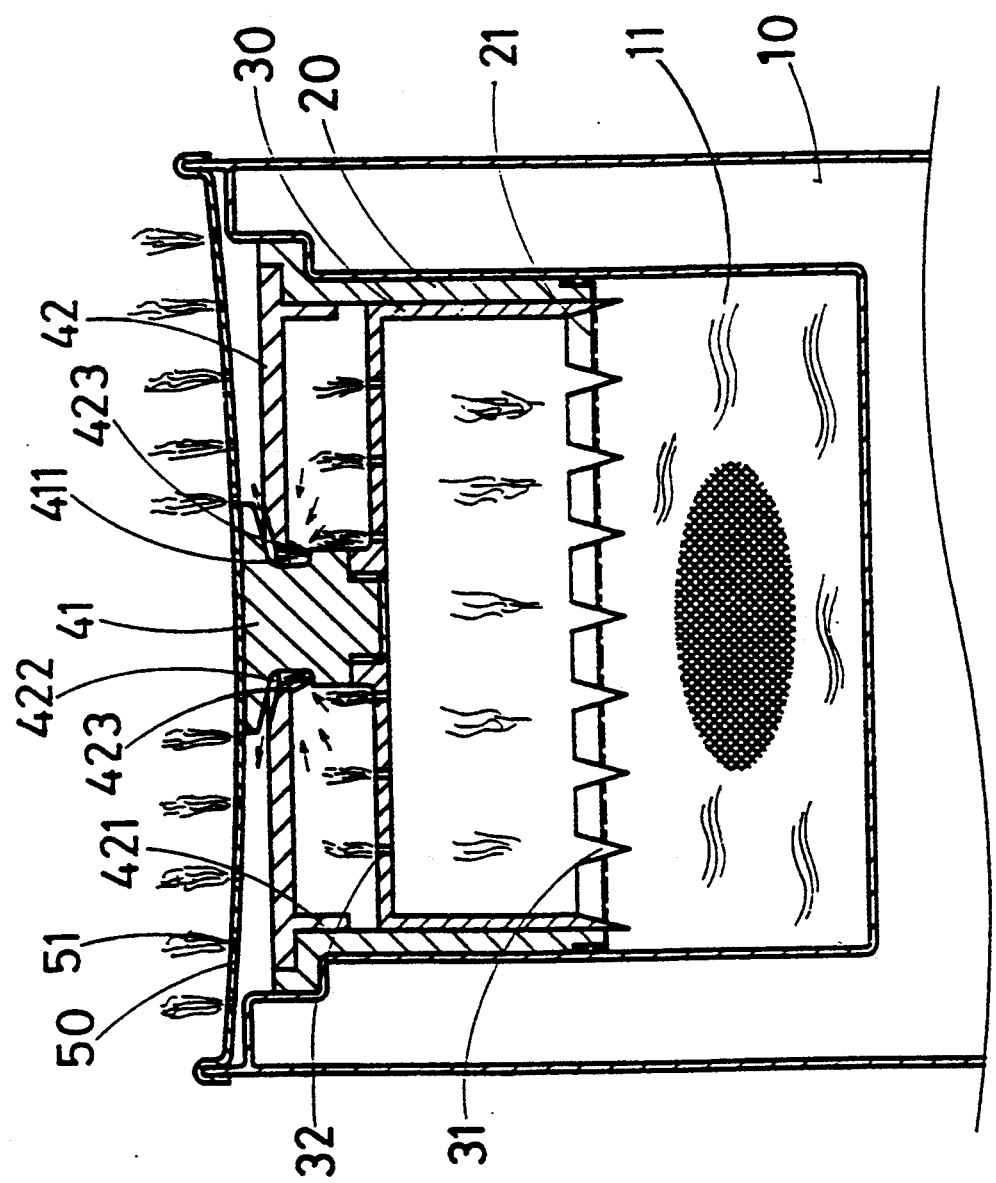

The can 10 has a lower portion which accommodates a cup-shaped heating chamber 11 containing active lime, as shown in FIGS. 3 and 4.

A cylindrically shaped cup 20 is located inside the heating chamber 11 above the active lime having a thin plate 21 forming a bottom end. A predetermined volume of water is contained in the cylindrical cup 20 for purposes to be further described.

The spiking member 30 is a cylindrically contoured cover-shaped member with a number of sharp spikes 31 extending from the lower edge of the lateral walls thereof and a number of ventilation holes 32 are formed through the upper surface of the spiking member 30. The sharp spikes 31 are entirely positioned within the cylindrical cup 20 over the thin plate 21. The positioner device 40 is mounted on the upper surface of the spiking member 30 and secured by a positioner fastener or plug 41 that functions as a screw-type fastener.

The positioner device 40 includes both the positioner fastener or plug 41 and the round positioner plate 42. The lower end of the positioner fastener 41 is threadedly secured to the spiking member 30. Formed around and circumscribing the center section of the positioner fastener 41 is a positioner groove 411. The round positioner plate 42 has an upper circumference that fits within the inner diameter of the cylindrical cup 20 and the reduced circumference section forms a lip 421. The aforesaid reduced circumference section is inserted tightly into the spiking member 30. A hole 422 is formed through the center of the round positioner plate 42 with a small number of positioner tabs 423 extending therefrom along the inner circumference of the hole 422 that enables the positioner fastener or plug 41 to be centered tightly when inserted through the hole 422.

The bottom cover 50 is positioned above the positioner fastener 41 and there are a number of ventilation holes 51 formed through the upper surface of the bottom cover 50. The outer circumference of the bottom cover 50 is formed such that bottom cover 50 can be firmly inserted into the lower opening of the easy-open can 10, as shown in FIGS. 3 and 4.

As shown in FIG. 4, when the invention is utilized, the bottom cover 50 is pressed down and responsively causes the positioner fastener 41 to move downward. The center section of the positioner fastener 41 passes through the hole 422, flexing the positioner tabs 423 inward and into the positioner groove 411, thereby completing the downward positioning movement of the positioner fastener 41. The lower end of the positioner fastener 41 forcibly presses against the spiking member 30, which causes the sharp spikes 31 to move downward and pierce the thin plate 21 beneath the cylindrical cup 20 and enables the water contained in the cylindrical cup 20 to flow out into the active lime contained in the heating chamber 11. A chemical reaction occurs that produces a large volume of heat that increases the temperature within the can 10 to heat the contents contained therein. The resulting steam escapes through the ventilation holes 32 in the spiking member 30, the hole 422 in the center of the round positioner plate 42 and the ventilation holes 51 formed through the upper surface of the bottom cover 50.

What is claimed is:

1. A self-heating container system comprising:
   (a) a cylindrically contoured can having a cup shaped member formed in a bottom section thereof, said cup shaped member forming a heating chamber containing active lime;
   (b) a bottom can cover secured to an end of said bottom section, said bottom can cover having a plurality of openings formed therethrough;
   (c) a cylindrical cup having a thin plate member forming a base of said cylindrical cup, said cylindrical cup being securely mounted within said cup shaped member, said cylindrical cup having a predetermined volume of water contained therein;
   (d) a cup shaped spiking member having a plurality of holes formed through a base member and a plurality of spike members formed on an end section of a lateral wall of said cup shaped spiking member, said cup shaped spiking member located contiguous to an inner wall surface of said cylindrical cup and being slidably displaceable within said cylindrical cup, said base member having a threaded opening formed therein;
   (e) a positioner plate having a lip for securement to an end of said cylindrical cup member and having a centrally located positioner plate opening formed therethrough;

(f) a displaceable positioner plug member having a groove formed within a peripheral wall thereof, said displaceable positioner plug member extending through said centrally located positioner plate opening and threadedly secured within said threaded opening of said base member of said spiking member on a first end thereof, an opposing second end of said displaceable positioner plug member located adjacent said bottom can cover, said positioner plate opening defining a peripheral wall having a plurality of positioner plate tab members extending therefrom for contacting an inner wall of said displaceable plug member defined by said groove and maintaining a contained relation between said positioner plug member and said positioner plate, whereby displacement of said bottom can cover causes contact with said plug member second end and displaces said plug member and said spiking member for penetrating said thin plate member by said spike members thereby opening a plurality of passages for mixing of said active lime and said water to produce heat.

* * * * *